US005702490A

United States Patent [19]
Kneip et al.

[11] Patent Number: 5,702,490
[45] Date of Patent: Dec. 30, 1997

[54] WATER REPELLENT TREATMENT OF LEATHER AND SKINS WITH POLYSILOXANES FUNCTIONALIZED WITH CARBOXYL GROUPS IN A COMB-LIKE MANNER

[75] Inventors: Michael Kneip, Frankenthal; Peter Danisch, Ludwigshafen, both of Germany

[73] Assignee: BASF Aktiengesellschaft, Ludwigshafen, Germany

[21] Appl. No.: 687,447

[22] PCT Filed: Feb. 6, 1995

[86] PCT No.: PCT/EP95/00418

§ 371 Date: Aug. 15, 1996

§ 102(e) Date: Aug. 15, 1996

[87] PCT Pub. No.: WO95/22627

PCT Pub. Date: Aug. 24, 1995

[30] Foreign Application Priority Data

Feb. 16, 1994 [DE] Germany ............... 44 04 890.4

[51] Int. Cl.[6] ............... C14C 9/00; C08L 83/06
[52] U.S. Cl. ............... 8/94.23; 8/94.21; 8/94.22; 8/94.18; 8/94.33; 252/8.57; 528/41; 528/26; 524/837
[58] Field of Search ............... 252/8.57; 8/94.21, 8/94.22, 94.23, 94.18, 94.33; 427/387, 389; 528/41, 26; 524/837

[56] References Cited

U.S. PATENT DOCUMENTS 4,701,269  10/1987  Bay et al. ............... 252/8.57

FOREIGN PATENT DOCUMENTS

| 103871 | 3/1984 | European Pat. Off. . |
| 205 096 | 12/1986 | European Pat. Off. . |
| 213 480 | 3/1987 | European Pat. Off. . |
| 299596 | 1/1989 | European Pat. Off. . |
| 324 345 | 7/1989 | European Pat. Off. . |
| 556 740 | 8/1993 | European Pat. Off. . |

*Primary Examiner*—Alan Diamond
*Attorney, Agent, or Firm*—Oblon, Spivak, McClelland, Maier & Neustadt, P. C.

[57] ABSTRACT

Leather and skins are water repellent in aqueous emulsion in the presence of emulsifiers with polysiloxanes which are functionalized with carboxyl groups in a comb-like manner and in which the carboxyl groups are bonded to the polymer main chain via spacer groups in the form of linear or branched $C_2$–$C_{40}$-alkylene groups which may be interrupted by up to 8 non-neighboring oxygen atoms or groups of the formula —$NR^1$—, CO— [sic] or —CO—$NR^1$— and in addition may carry up to 5 carboxyl groups or carboxamido groups of the formula —CO—$NR^1R^2$—, where $R^1$ and $R^2$ are each hydrogen or $C_1$–$C_4$-alkyl, the spacer groups being bonded to the polymer main chain via a direct bond or via an oxygen atom or a group of the formula —$NR^1$—, —CO—, —CO—$NR^1$— or —CO—O—.

8 Claims, No Drawings

WATER REPELLENT TREATMENT OF LEATHER AND SKINS WITH POLYSILOXANES FUNCTIONALIZED WITH CARBOXYL GROUPS IN A COMB-LIKE MANNER

This application is a 371 of PCT/EP95/00418 filed Feb. 6, 1995.

The present invention relates to an improved process for the water repellent treatment of leather and skins with carboxyl-containing polysiloxanes in an aqueous emulsion in the presence of emulsifiers. The present invention furthermore relates to an agent for the water repellent treatment of leather and skins in the form of an aqueous emulsion.

EP-B-213 480 discloses a process for the water repellent treatment of leather and skins using an aqueous emulsion of from 15 to 90% by weight of silicone oil, from 5 to 30% by weight of an N-($C_9$–$C_{20}$-acyl)amino acid as an emulsifier and from at least 5 to the remainder to make 100% by weight of water, which has a pH of from 5 to 12. For example, dimethyl polysiloxanes having on average from 2 to 10 carboxyl groups per molecule may be used as the silicone oil.

However, the performance characteristics and the results obtained during the use are not optimum in the case of such silicone oil emulsions. The stability of the emulsions, in particular during storage, and the compatibility with paraffin emulsions are unsatisfactory. The water repellent effect can also be further improved. Slight impairment of the finishing of the leathers during the water repellent treatment with these agents can also be observed in some cases. It is also intended further to reduce the amount of silicone oil used.

The water repellent effect of the existing systems is often insufficient for the requirements of the market, in particular of the US market. In the Maeser test usually employed there, flex values of >15000 are required. This cannot be achieved in a reproducible manner with the conventional products, so that in practice it is often necessary to carry out aftertreatment with solvent-containing silicones (application by spraying or by means of rollers). The solvent-containing products pollute the air. In addition, the silicone treatment of the surface complicates the finishing of the leathers, especially through adhesion problems. A further difficulty is that, when excessively large amounts of silicone are used, the resulting leather becomes too soft, for example as upper leather for shoes.

It is an object of the present invention to provide leather water repellents having correspondingly improved performance characteristics and giving improved results during use.

We have found that this object is achieved by a process for the water repellent treatment of leather and skins with carboxyl-containing polysiloxanes in an aqueous emulsion in the presence of emulsifiers, which comprises using polysiloxanes which are functionalized with carboxyl groups in a comb-like manner and in which the carboxyl groups are bonded to the polymer main chain via spacer groups in the form of linear or branched $C_2$–$C_{40}$-alkylene groups which may be interrupted by up to 8 non-neighboring oxygen atoms or groups of the formula —$NR^1$—, —CO— or —CO—$NR^1$— and in addition may carry up to 5 carboxyl groups or carboxamido groups of the formula —CO—$NR^1R^2$, where $R^1$ and $R^2$ are each hydrogen or $C_1$–$C_4$-alkyl, the spacer groups being bonded to the polymer main chain via a direct bond or via an oxygen atom or a group of the formula —$NR^1$—, —CO—, —CO—$NR^1$— or —CO—O—.

The essential function of the spacer group is to provide a certain distance between the silicone polymer main chain and the reactive carboxyl groups. The side chains composed of spacer groups and carboxyl groups are equivalent to the teeth of the comb molecule.

Linear polymethylene groups of the formula —($CH_2$)$_m$—, where m is from 2 to 40, in particular 5 to 25, especially from 8 to 18, and $C_2$–$C_{40}$-alkylene, in particular $C_5$–$C_{20}$-alkylene, especially $C_8$–$C_{18}$-alkylene, groups which are branched, in particular only slightly branched, ie. have on average not more than one methyl or ethyl group per 3 carbon atoms in the linear part of the chain, are preferred for such spacer groups.

Some or all of the spacer groups may consist of polyoxyalkylene units, for example polyoxyethylene units. Analogous polyazaalkylene units in which the carbon chain is interrupted by —NH—, —N($CH_3$), —N($C_2H_5$)—, —N($C_3H_7$)— or —N($C_4H_9$)— may also be present for this purpose. Interrupting carboxamido groups, such as —CO—NH— or —CO—N($CH_3$)—, may also be present. The number of interrupting heteroatoms or groups containing heteroatoms may be up to 8, in particular up to 5, especially up to 3.

Furthermore, the spacer groups themselves may be substituted by further carboxyl groups or by carboxamido radicals, such as —CO—$NH_2$ or —CO—N($CH_3$)$_2$. The number of such substituents may be up to 5, in particular up to 3, especially up to one. Z, which is the link between the spacer group and the polymer main chain, is in particular a direct bond or an oxygen atom but may also be a carbonyl, a carboxamido, eg. —CO—NH— or —CO—N($CH_3$)—, or a carboxylic ester function. In the case of carboxamido and carboxylic ester functions, the carbonyl carbon atom may be bonded both to the polymer main chain and to the spacer group.

Polysiloxanes are to be understood as meaning polymers which have repeating Si—O—Si units in the main chain. The remaining valences (with the exception of the —Z—A—COOH side chains) are usually saturated with hydrogen, hydroxyl, $C_1$–$C_4$-alkyl, phenyl, $C_1$–$C_4$-alkoxy, amino, mono-$C_1$–$C_4$-alkylamino, di-$C_1$–$C_4$-alkylamino, chlorine or fluorine. Among these, $C_1$–$C_4$-alkyl, in particular $C_1$–$C_3$-alkyl, especially methyl, and also phenyl occur in most cases.

In general, exclusive polysiloxanes of different structure types are present, said mixtures being the result of the preparation process: siloxanes in the form of chain polymers (generally main components of the mixtures), branched siloxanes, cyclic siloxanes and crosslinked siloxanes. Polysiloxanes usually have molecular weights of from 5000 to 150,000.

In a preferred embodiment of the novel leather water repellent treatment process, polysiloxanes whose main component has a structure of the general formula I

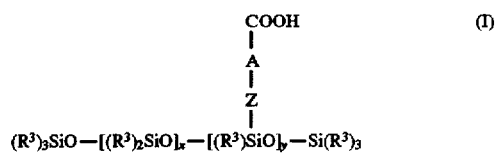

where
the radicals $R^3$ are identical or different and, independently of one another, are each hydrogen, hydroxyl, $C_1$–$C_4$-alkyl, phenyl, $C_1$–$C_4$-alkoxy, amino, mono-$C_1$–$C_4$-alkylamino, di-$C_1$–$C_4$-alkylamino, chlorine or fluorine, it also being possible for $R^3$ at each of the chain ends to be a group —Z—A—COOH, A is linear or branched $C_5$–$C_{25}$-alkylene, Z is a direct bond, an oxygen atom or a group of the formula —$NR^1$—, —CO—, —CO—$NR^1$— or —CO—O—, where $R^1$ is hydrogen or $C_1$–$C_4$-alkyl, and x and y indicate the associated randomly distributed structural units in a total number of from 50 to 200, on average from 1 to 50, in particular from 2 to 20, especially from 2.5 to 15, carboxyl groups being present per molecule I, are used as polysiloxanes functionalized with carboxyl groups in a comb-like manner.

Particularly preferably used polysiloxanes I are those in which the sum of x and y is from 100 to 500, in particular from 120 to 300, the ratio of x to y being from 99:1 to 9:1.

Also of particular interest are polysiloxanes I in which $R^3$ is $C_1$–$C_3$-alkyl, in particular methyl.

The carboxyl groups may be present both as free carboxylic acids and in partial or complete salt form, for example as alkali metal salts, such as sodium salts or potassium salts, as ammonium salts or as amine salts.

The novel leather water repellent treatment process can be particularly readily carried out if the aqueous emulsion of the polysiloxanes additionally contains paraffins which may be solid and/or liquid, for example those having a melting point of from 20° to 100° C., liquid paraffins or white oils, mineral oils, natural fats or natural oils, for example fish oil or bone oil, or synthetic or natural waxes, for example polyethylene waxes, polyisobutylene waxes, beeswax or Karnauba wax, usually in an amount of up to 90, in particular up to 50, especially up to 30, % by weight.

Suitable emulsifiers are in principle all nonionic, anionic, cationic or amphoteric compounds which have surfactant properties in aqueous systems and which sufficiently emulsify the polysiloxanes used and paraffins, liquid paraffins, fats, oils and waxes and do not adversely affect the water repellent treatment, but in particular N-($C_9$-$C_{20}$-acyl)amino acids having 2 to 6 carbon atoms in the amino acid skeleton, such as N-oleoylsarcosine, N-stearoylsarcosine, N-lauroylsarcosine or N-isononanoylsarcosine; the latter generally present in the form of their alkali metal, ammonium or trialkanolamine salts. The polysiloxane emulsion usually contains from 3 to 30, in particular from 5 to 5, especially from 7 to 18, % by weight of emulsifiers, and mixtures of the stated emulsifiers may also be used.

The polysiloxane emulsions described usually contain from 3 to 90, in particular from 5 to 60, especially from 7 to 40, % by weight of polysiloxanes functionalized with carboxyl groups in a comb-like manner. The emulsions are usually used in amounts of from 0.1 to 20, in particular from 0.5 to 15, % by weight, based on the shaved weight of the leather or the wet weight of the skins. It may be advisable to dilute the emulsions (concentrates) described with water in a ratio of from 1:2 to 1:5 and to add the working liquor during the water repellent treatment of the leather.

The novel water repellent treatment may be carried out in one stage or in two stages during an after the retanning. Advantageous tanning agents for the retanning are vegetable tanning agents and synthetic tanning agents, for example those based on phenolsulfonic acid/formaldehyde condensates. Examples of suitable dyes which may be simultaneously used are the acidic, substantive or basic aniline dyes usually employed.

The actual novel water repellent treatment during or after the retanning is carried out, as a rule, with drumming in a suitable apparatus in a manner known per se, ie. with liquor lengths of from 50 to 2000%, preferably from 100 to 400%, based on the shaved weight of the leather or wet weight of the skins, and at from 20° to 60° C., preferably from 35° to 50° C., the pH at the beginning being, as a rule, from 4.5 to 8.0, preferably from 4.8 to 5.5. In general, the water repellent treatment is complete within a period of from 20 to 240, preferably from 30 to 120, minutes.

At the end of the water repellent treatment, the emulsifier is usually fixed with an acid, preferably formic acid, by bringing the pH to 3.0–5.0, preferably 3.8–4.0.

The effect of the water repellent treatment can be reinforced by an aftertreatment with a divalent, trivalent or tetravalent metal salt usually used in the tannery, in particular with a basic chromium sulfate, or with aluminum sulfate, zirconium sulfate, titanium sulfate, calcium chloride or magnesium sulfate. Advantageously from 0.5 to 5, preferably from 1 to 2, % by weight, based on the shaved weight of the leather or wet weight of the skins, of the stated salts are used. Among the salts indicated, basic chromium sulfates and aluminum sulfate are preferred.

The present application also relates to agents for the water. repellent treatment of leather and skins in the form of an aqueous emulsion, comprising a content of polysiloxanes, which are functionalized with carboxyl groups in a comb-like manner and in which the carboxyl groups are bonded to the polymer main chain via spacer groups in the form of linear or branched $C_2$-$C_{40}$-alkylene groups which may be interrupted by up to 8 non-neighboring oxygen atoms or groups of the formula —$NR^1$—, —CO— or —CO—$NR^1$— and in addition may carry up to 5 carboxyl groups or carboxamido groups of the formula —CO—$NR^1R^2$, where $R^1$ and $R^2$ are each hydrogen or $C_1$-$C_4$-alkyl, the spacer groups the spacer groups [sic] being bonded to the polymer main chain via a direct bond or via an oxygen atom or a group of the formula —$NR^1$—, —CO—, —CO—$NR^1$— or —CO—O—.

A preferred agent of this type contains from 3 to 90% by weight of polysiloxanes functionalized with carboxyl groups in a comb-like manner, from 3 to 30% by weight of emulsifiers and from 0 to 50% by weight of paraffins, liquid paraffins or white oils, mineral oils, natural fats or natural oils or synthetic or natural waxes, the percentages being based on the amount of aqueous emulsion.

An important advantage of the present invention is that, as a rule, adequate water repellent effects are achieved with smaller amounts of polysiloxanes functionalized with carboxyl groups in a comb-like manner than with the prior art water repellent agents containing polysiloxanes.

Furthermore, the present water repellent treatment process operates without organic solvents and is purely water-based.

Emulsions having a long shelf life are obtained even when paraffins or mineral oils are concomitantly used. The lipophilic spacer also improves the compatibility with the paraffin emulsion since the addition of normal silicone oils to a stable paraffin/mineral oil emulsion generally leads to separation of the emulsion. With the polysiloxane described here, a stable emulsion is obtained even when larger amounts are used. This shows, inter alia, that the silicone oil can be simply stirred into the paraffin emulsion. A further homogenization step is not absolutely essential to prepare the emulsion. Consequently, it is also not necessary to make the product storage-stable by increasing the viscosity (for example by means of thickeners), so that it is present in a user-friendly liquid, pumpable form.

With the use of the polysiloxanes described, which are functionalized with carboxyl groups in a comb-like manner, finishing, ie. surface treatment of the leathers, is. influenced to a substantially smaller extent or even in general only to an imperceptible extent, since the polysiloxane is more readily distributed in the leather cross-section.

The water repellent effect of the polysiloxanes described, which are functionalized with carboxyl groups in a comb-like manner, is substantially better than that of prior art water repellent agents containing polysiloxanes.

EXAMPLES

Preparation of polysiloxane emulsions to be used according to the invention

5% strength by weight (Emulsion 1) and a 10% strength by weight polysiloxane Ia emulsion (Emulsion 2) were prepared by slowly adding the corresponding amounts of polysiloxane (viscosity.: about 600 mm²/s) of the statistical formula Ia

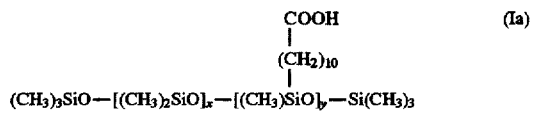

where the sum of x and y is from about 140 to 150 and y is about 3, to a commercial, weakly alkaline aqueous paraffin slack wax (36°/38° C.)/white oil/N-oleoylsarcosine emulsion, while stirring.

Stable homogeneous emulsions are formed directly when the components are stirred together, so that subsequent homogenization, for example using a split homogenizer, is no longer necessary. The abovementioned components may also be added individually without changing the performance characteristics.

Testing of the performance characteristics

Chrome-tanned side leather (wet blues) which had a shaved thickness of 2 ram and had been deacidified to a pH of 5 was drummed for 90 minutes ih a tanning vessel with 4% by weight of commercial mimosa extract, 4% by weight of a commercial synthetic tanning agent based on phenolsulfonic acid/formaldehyde condensate, 3% by weight of a commercial polymer tanning agent and 2% by weight of a commercial leather dye, the percentages in each case being based on the shaved weight.

Drumming was then carried out with 8% by weight, based on the shaved weight, of each of the water repellent emulsions from Example 1 and Example 2 for 90 minutes, and the working liquor of 100% [sic] was acidified to a pH of 3.8 with formic acid, after which washing was carried out. Finally, mineral salt fixation was effected with 3% by weight of a commercial chrome tanning agent for 90 minutes in the tanning vessel.

The leathers were washed, mechanically set out and dried. The resulting leathers were soft, had a pleasant handle and could be readily finished.

For comparison, the same tanned and dyed leather was rendered water repellent in a similar manner with 13% by weight, based on the shaved weight, of Emulsion A.

Emulsion A was obtained by adding 11.3% by weight of a commercial dimethylpolysiloxane having 4 carboxyl groups bonded directly to the silicone polymer main chain to commercial, weakly alkaline aqueous paraffin slack wax (36°/38° C.)/white oil/N-oleoyl-sarcosine emulsion.

Whereas Emulsion A had separated after 7 days on standing at 22° C., Emulsions 1 and 2 were still stable after 6 months at 22° C.

Testing of the unfinished leathers in the Bally penetrometer (according to IUP 10) at 15% compressive strain gave a water absorption (after 24 h) of 16% by weight and 13% by weight, respectively, for Emulsions 1 and 2 and a corresponding water absorption of 19% by weight for Emulsion A. In all three cases, there was no penetration of water after 24 [lacuna].

The Maeser test (according to ASTM D 2099-70, testing in both the roughened and unroughened state) gave flex values of from 15,000 to 30,000 and of from 20,000 to >100,000 for Emulsions 1 and 2, respectively, and corresponding values of from 5,000 to 15,000 for Emulsion A.

It can clearly be seen that Emulsions 1 and 2 used according to the invention perform better in both application tests although the polysiloxane which is functionalized with carboxyl groups in a comb-like manner was used in a smaller amount compared with the conventional polysiloxane (5 and 10% by weight in Emulsion 1 and 2, respectively, compared with 11.3% by weight in Emulsion A, in addition only 8% by weight of Emulsion 1 or 2 being used in the water repellent treatment, compared with 13% by weight of Emulsion A).

We claim:

1. A process for the water repellant treatment of leather and skins, comprising contacting leather or a skin with carboxyl-containing polysiloxanes in an aqueous emulsion in the presence of emulsifiers, wherein said polysiloxanes have a polymer main chain which is functionalized with carboxyl groups, wherein the carboxyl groups are bonded to the polymer main chain in the form as teeth in a comb via spacer groups in the form of linear or branched [$C_2$—] $C_5$–$C_{40}$-alkylene groups optionally interrupted by up to 8 non-neighboring oxygen atoms or groups of the formula —$NR^1$—, —CO— or —CO—$NR^1$— and in addition optionally carry up to 5 carboxyl groups or carboxamido groups of the formula —CO—$NR^1R^2$, where $R^1$ and $R^2$ are each hydrogen or $C_1$–$C_4$-alkyl, the spacer groups being bonded to the polymer main chain via a direct bond or via an oxygen atom or a group of the formula —$NR^1$—, —CO—, —CO—$NR^1$— or —CO—O—.

2. A process for the water repellent treatment of leather and skins as claimed in claim 1, wherein said aqueous emulsion further contains paraffins, liquid paraffins or white oils, mineral oils, natural fats or natural oils or synthetic or natural waxes.

3. A process for the water repellent treatment of leather and skins as claimed in claim 1, wherein said polysiloxanes have a structure of the formula I

where the radicals $R^3$ are identical or different and, independently of one another, are each hydrogen, hydroxyl, $C_1$–$C_4$-alkyl, phenyl, $C_1$–$C_4$-alkoxy, amino, mono-$C_1$–$C_4$-alkylamino, di-$C_1$–$C_4$-alkylamino, chlorine or fluorine, optionally $R^3$ at each of the chain ends is a group —Z—A—COOH, A is linear or branched $C_5$–$C_{25}$-alkylene, Z is a direct bond, an oxygen atom or a group of the formula —$NR^1$—, —CO—, —CO—$NR^1$— or —CO—O—, where $R^1$ is hydrogen or $C_1$–$C_4$-alkyl, and the sum of x and y is from 50 to 200.

4. A process for the water repellent treatment of leather and skins as claimed in claim 3, wherein the spacer groups are bonded to the polymer main chain via an oxygen atom or a group of the formula —NR$^1$—, —CO—, —CONR$^1$ or —CO—O—, wherein R$^1$ is as defined in claim 8.

5. A process for the water repellent treatment of leather and skins as claimed in claim 1, wherein the alkylene groups of the spacer groups are C$_8$–C$_{40}$-alkylene groups.

6. A process for the water repellent treatment of leather and skins as claimed in claim 1, wherein the spacer groups are bonded to the polymer main chain via an oxygen atom or a group of the formula —NR$^1$—, —CO—, —CONR$^1$ or —CO—O—, wherein R$^1$ is as defined in claim 1.

7. An agent for the water repellent treatment of leather and skins in the form of an aqueous emulsion, which comprises polysiloxanes having a polymer main chain which is functionalized with carboxyl groups, wherein the carboxyl groups are bonded to the polymer main chain in the form as teeth in a comb via spacer groups in the form of linear or branched C$_2$–C$_{40}$-alkylene groups optionally interrupted by up to 8 non-neighboring oxygen atoms or groups of the formula —NR$^1$—, —CO— or —CO—NR$^1$— and in addition optionally carry up to 5 carboxyl groups or carboxamido groups of the formula —CO—NR$^1$R$^2$—, where R$^1$ and R$^2$ are each hydrogen or C$_1$–C$_4$-alkyl, the spacer groups being bonded to the polymer main chain via an oxygen atom or a group of the formula —NR$^1$—, —CO—, —CO—NR$^1$— or —CO—O—, wherein R$^1$ is as above defined.

8. An agent for the water repellent treatment of leather and skins in the form of an aqueous emulsion as claimed in claim 7, containing from 3 to 90% by weight of said polysiloxanes functionalized with carboxyl groups, from 3 to 30% by weight of emulsifiers and from 0 to 50% by weight of paraffins, liquid paraffins or white oils, mineral oils, natural fats or natural oils or synthetic or natural waxes.

* * * * *